(No Model.)

C. E. MARK.
MANIFOLD.

No. 389,313. Patented Sept. 11, 1888.

Attest:
W. H. Patton.
Chas. R. Dunbar.

Inventor.
Charlie E. Mark.
By A. J. Sprague,
Atty.

UNITED STATES PATENT OFFICE.

CHARLIE E. MARK, OF CLEVELAND, OHIO, ASSIGNOR TO THE MARKS AUTOMATIC CAR COUPLER COMPANY, OF SAME PLACE.

MANIFOLD.

SPECIFICATION forming part of Letters Patent No. 389,313, dated September 11, 1888.

Application filed February 4, 1888. Serial No. 263,014. (No model.)

*To all whom it may concern:*

Be it known that I, CHARLIE E. MARK, a citizen of the United States, residing at Cleveland, in the county of Cuyahoga and State of Ohio, have invented certain new and useful Improvements in Manifolds, of which the following is a specification, reference being had therein to the accompanying drawings.

This invention relates to certain new and useful improvements in manifolds, especially designed for use in hot-water-circulating systems.

The invention consists in the peculiar construction and arrangement of parts and the means employed for securing a plurality of pipe in the cap of the manifold, all as more fully hereinafter set forth, and specifically pointed out in the claims.

Figure 1:
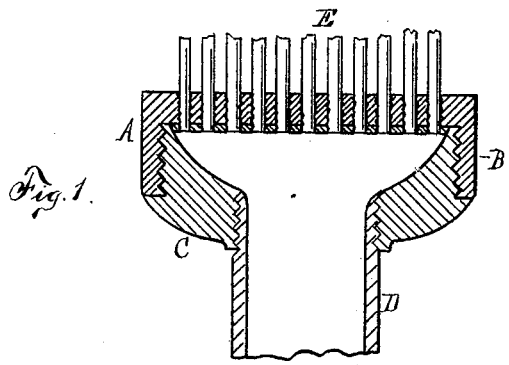
Figure 2:
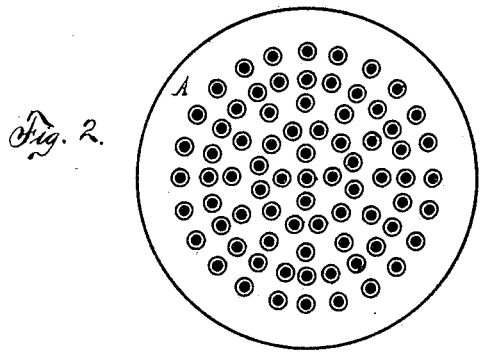

Figure 1 is a central axial section through my improved device, and Fig. 2 is a plan view thereof.

In the accompanying drawings, which form a part of this specification, A represents a cap provided with an annular flange, B, which is interiorly threaded to engage with the annular ring C, which in turn screws upon the pipe D of the water-circulating system of pipes.

Through the cap A, I preferably form a plurality of screw-threaded holes in the axial direction of the cap, and into these holes I insert a series of pipes, E, with their ends projecting slightly beyond the inner face of the cap. An expanding-reamer is then inserted in the ends of the pipes to expand them and compel them to engage with the screw-threads of their respective holes. This being done, the ends of the pipes are then stopped with wax or other suitable material that is easily removed, and molten metal, *d*—such as lead— is then poured in around the ends of the pipes, thus insuring a perfectly water and steam tight joint.

The purpose for which this construction is the more especially designed is that of reducing the body of circulating water to a plurality of bodies at a point in close proximity to the heating agent employed, and whereby the water may be the more readily heated, and thus produce a circulation through the system of piping in less time than it could be accomplished did such water pass under the action of the heat in one pipe.

It will readily be seen that the construction is such as to admit of a disconnection of the parts for the purpose of cleaning or repairs.

What I claim as my invention is—

1. A manifold for a system of piping, consisting of an annularly-threaded cap carrying a plurality of conducting-pipes and an annular reducing-ring engaging with said cap, substantially as and for the purposes described.

2. A manifold for a system of piping, consisting of an annularly-flanged cap provided with a plurality of threaded openings in the axial direction of said cap, a series of pipes expanded into the said threaded openings, a filling or bushing around the inner ends of said pipes, and an annular reducing ring or nipple, the parts being constructed, arranged, and operating substantially in the manner and for the purposes set forth.

3. In a manifold, the combination of the cap A, provided with the annular threaded flange B, a series of pipes, E, expanded into a plurality of threaded openings in the said cap and in the axial direction thereof, a filling or bushing, *d*, and annular reducing nipple or ring C, substantially as and for the purposes specified.

In testimony whereof I affix my signature in presence of two witnesses, this 2d day of February, 1888.

CHARLIE E. MARK.

Witnesses:
W. H. PATTON,
CHAS. R. DUNBAR.